Dec. 12, 1967     J. G. DOUGHERTY, JR     3,358,280

SYNCHRO DATA CONVERSION METHOD AND APPARATUS

Filed June 26, 1964

INVENTOR.
JAMES G. DOUGHERTY, JR.

BY Brumbaugh, Free, Graves + Donohue his ATTORNEYS.

United States Patent Office 3,358,280
Patented Dec. 12, 1967

3,358,280
SYNCHRO DATA CONVERSION METHOD
AND APPARATUS
James G. Dougherty, Jr., Bethesda, Md., assignor to Vitro Corporation of America, New York, N.Y., a corporation of Delaware
Filed June 26, 1964, Ser. No. 378,201
10 Claims. (Cl. 340—347)

ABSTRACT OF THE DISCLOSURE

A synchro data conversion system for electronically converting the synchro angle at which the rotor winding of a conventional syncho transmitter is positioned to direct current analog, alternating current analog or digital form, by generating a signal which is the difference between the signals at two of the stator windings, modifying the amplitude of the difference signal, shifting the phase of the signal at the third stator winding, and adding the modified amplitude difference signal and the phase shifted signal to produce an output signal having a phase shifted from that of the excitation voltage applied to the rotor winding by an amount representative of the synchro angle.

---

This invention relates to a method and apparatus for converting synchro data and the like to analog or digital form and, more particularly, for electronically converting synchro angles to direct current analog, alternating current analog, or digital form.

Conventional devices for converting synchro data to analog or digital form require moving parts, and often employ servomechanisms and shaft encoders of the brush, optical or magnetic type. These prior art devices using a number of moving parts are relatively large and unreliable, making then unsuitable for numerous applications, such as in the space and military fields.

These and other disadvantages are obviated by the present invention which accomplishes the desired conversion with no moving parts and is capable of being fabricated with solid state components. In accordance with the present invention, a signal is generated which is the difference between the signals appearing at two of the stator windings of a conventional synchro transmitter, the rotor winding of which is positioned at the synchro angle to be transmitted and is excited by an alternating current voltage, modifying the amplitude of this difference signal, shifting the phase of the signal appearing at the third stator winding to produce a first phase shifted signal, adding the reduced amplitude difference signal and the first phase shifted signal to produce a second phase shifted signal, the phase being shifted from that of the excitation voltage in response to the synchro angle, and generating a signal representative of the phase difference between the excitation voltage and the second phase shifted signal. This phase difference signal may then be integrated to produce a direct current analog signal of magnitude proportional to the synchro angle, or if an alternating current analog signal proportional to the the synchro angle is desired, an alternating current reference voltage is fed to an amplifier, the gain of which is controlled by the direct current analog signal. If the synchro angle be desired in digital form, the phase difference signal is employed to control gating means to which clock pulses are fed, the gated clock pulses being counted electronically to produce the desired digital signal.

The invention is more fully explained in the following detailed description of exemplary embodiments taken in conjunction with the accompanying figures of the drawing, in which.

Figure 1:
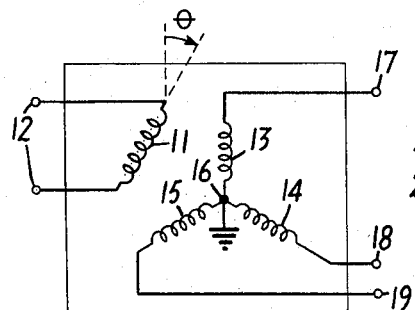
FIGURE 1 is a schematic illustration of the electrical circuit of a synchro transmitter, the synchro angle of which is to be converted to analog or digital form.

In the representative embodiments of the invention shown by way of example in the drawing, FIG. 1 illustrates a conventional synchro transmitter 10 having a rotor winding 11 connected to a pair of terminals 12, and three stator windings 13, 14 and 15. One end of each of these stator windings is connected to one another at a common reference point 16 such as an electrical ground, while the other ends of the stator windings 13, 14 and 15 are connected to terminals 17, 18 and 19 respectively. If an alternating current (sine wave) voltage equal to $A \sin wt$ is applied to the rotor terminals 12 (where $A$ = maximum amplitude, $w$ = angular velocity and $t$ = time) and the synchro angle $\theta$ is the angular position of the rotor winding 11 with respect to the stator windings 13, 14 and 15, then the voltages $S_{17N}$, $S_{18N}$ and $S_{19N}$ appearing at the stator terminals 17, 18 and 19 with respect to the common or neutral point 16 may be expressed by the following relationships:

$$S_{17N} = A' \sin (\theta + 120°) \sin wt \quad (1)$$
$$S_{18N} = A' \sin \theta \sin wt \quad (2)$$
$$S_{19N} = A' \sin (\theta + 240°) \sin wt \quad (3)$$

Subtracting Relation 3 from Relation 1:

$$S_{17N} - S_{19N} = A'\sqrt{3} \cos \theta \sin wt \quad (4)$$

Dividing Relation 4 by $\sqrt{3}$:

$$\frac{S_{17N} - S_{19N}}{\sqrt{3}} = A' \cos \theta \sin wt \quad (5)$$

Shifting the phase of Relation 2 by 90°, such as in a lagging direction:

$$S_{18N} \underline{/-90°} = A' \sin (wt - 90°) \sin \theta$$
$$= -A' \cos wt \sin \theta \quad (6)$$

Adding Relations 5 and 6:

$$\frac{S_{17N} - S_{19N}}{\sqrt{3}} + S_{18N} \underline{/-90°} = A' (\sin wt \cos \theta - \cos wt \sin \theta)$$
$$= A' \sin (wt - \theta) \quad (7)$$

Relation 7 represents an alternating current (sine wave) voltage of frequency equal to that of the excitation voltage applied to the rotor terminals 12 ($w = 2\Pi f$), the phase of which is shifted from that of the excitation voltage by the synchro angle $\theta$.

Figure 2:
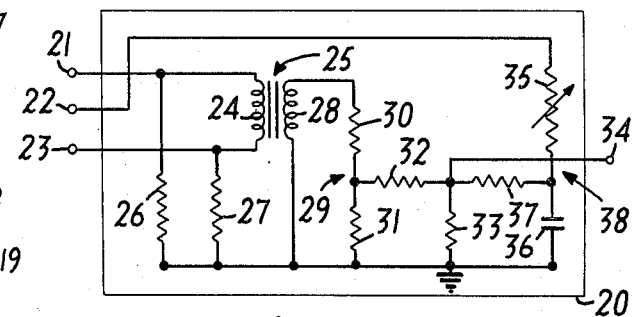
FIG. 2 is a schematic illustration of an electrical circuit according to the present invention to be coupled with the synchro transmitter of FIG. 1 for generating a signal of frequency equal to that of the excitation voltage applied to the synchro transmitter, but the phase of which is shifted from that angle of the excitation voltage in response to the synchro angle.

FIG. 2 shows the phase control circuit 20 to be coupled with the synchro transmitter 10 for generating the signal described by Relation 7. The terminals 21, 22 and 23 are adapted to be connected to the stator terminals 17, 18 and 19 respectively. The terminals 21 and 23 are connected directly to opposite ends of the primary winding 24 of a transformer 25 and through resistors 26 and 27, respectively, to a common reference point or ground. One end of the secondary winding 28 of the transformer 25 is also connected to the common reference point, while the other end is connected to a voltage divider network 29 including a pair of series connected resistors 30 and 31 leading to the common reference point. The junction of the resistors 30 and 31 is coupled through an isolating resistor 32 to one end of a load resistor 33 and to an output terminal 34, the other end of the resistor 33 being connected to the common reference point.

The terminal 22, adapted to be connected to the stator terminal 18, is connected to a variable resistor 35 of suitable conventional form which is connected to the common reference point through a capacitor 36 and coupled through an isolating resistor 37 to the output terminal 34. The variable resistor 35 and the capacitor 36 comprise an adjustable phase shifting network 38.

In operation, an alternating current excitation voltage is applied to the rotor terminals 12, the rotor winding 11 being positioned at the synchro angle $\theta$. The input terminals 21, 22 and 23 of the phase control circuit 20 being connected to the stator terminals 17, 18 and 19, respectively, the voltage across the primary winding 24 is $S_{17N} - S_{19N}$ (see Relation 4 above). The component values of the voltage divider network 29 are so chosen that the division by $\sqrt{3}$ is accomplished so that the component of the signal across the resistor 33 attributable to the stator terminals 17 and 19 is modified as described in Relation 5. In this regard, either or both of the resistors 30 and 31 may be adjustable in order to effect the desired division more readily, compensating in addition for any attenuation or amplification introduced by the transformer 25.

The variable resistor 35 is adjusted so that the voltage $S_{18N}$ is shifted preferably in a lagging direction by 90°, whereby the component of the signal across the resistor 33 attributable to the stator terminal 18 is described by Relation 6, the output signal appearing at the terminal 34 being that described by Relation 7, viz. an alternating voltage of frequency equal to that of the excitation voltage applied to the rotor winding 11 and having a phase shifted from that of the excitation voltage by the synchro angle $\theta$.

Figure 3:
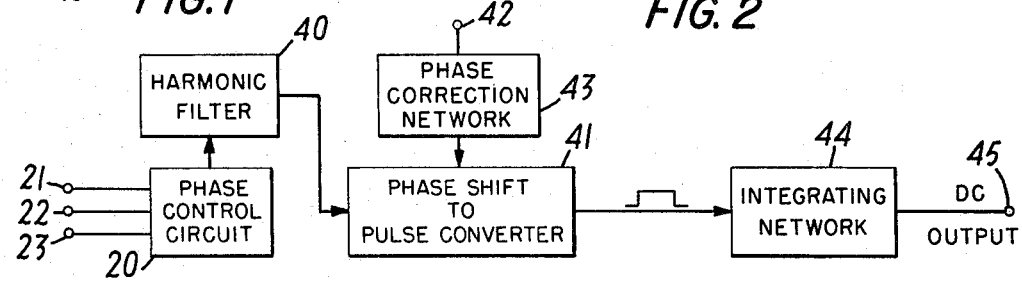
FIG. 3 is a block diagram of apparatus including the circuit of FIG. 2 for converting synchro data to direct current analog form.

FIG. 3 shows a block diagram of apparatus including the phase control circuit 20 for converting the synchro angle to direct current analog form. The output signal from the phase control circuit 20 is fed to a harmonic filter 40 of any suitable low pass type, which suppresses harmonics that may be generated in the synchro transmitter 10 and contribute errors in the phase shift to pulse conversion stage which follows. The circuit constants of the harmonic filter 40 depend upon the specific frequencies encountered and the impedances of the adjacent networks to be matched, and the design of such a filter is readily made by one skilled in the art.

The output of the harmonic filter 40 is fed to a phase-shift-to-pulse-converter 41, which detects the phase difference between the excitation voltage applied to the terminals 12 and the phase shifted signal appearing at the output terminal 34 of the phase control circuit 20. The excitation voltage is applied to an input terminal 42 of a phase correction network 43, the output of which is one of the two inputs supplied to the converter 41, the other input being taken from the filter 40. The network 43 is an adjustable phase shifting network of conventional form, which is adjusted to shift the phase of the excitation voltage applied to the terminal 42 by exactly the same amount as the total phase shift contributed by the synchro transmitter 10 and the harmonic filter 40. In this way, the phase difference detected by the converter 41 is that between the output of the phase control circuit 20 coupled to a synchro transmitter 10, which contributes no phase shift, and the excitation voltage. Thus the output of the converter 41 is proportional to the synchro angle of the rotor winding 11.

The phase-shift-to-pulse-converter 41 produces output pulses of constant amplitude and of duration proportional to the synchro angle by detecting the zero axis crossings of the two input signals to the converter. In particular, the positive zero axis crossings may be detected, for example, by a suitable trigger circuit, such as a Schmitt trigger circuit, which is triggered during the positive half cycles of the respective input signal. The square wave output of the trigger circuit coupled to the excitation voltage is used to set a suitable flip flop, or bistable multivibrator, and the square wave output of the trigger circuit coupled to the phase control circuit 20 resets this flip flop. Thus the output of the converter 41 is in the form of pulses of constant amplitude and of duration proportional to the phase difference between the signals supplied from the harmonic filter 40 and the phase correction network 43. While other circuits employed in phase demodulators which convert phase modulated signals to pulse width modulated signals may be substituted for the converter 41 just described, the converter preferably must be linear over a wide range of phase difference.

The phase difference signal produced by the converter 41 is applied to an integrating network 44, which provides a direct current analog signal at the output terminal 45 of magnitude proportional to the energy of the pulses of the phase difference signal and, therefore, proportional to the angular position of the rotor winding 11. The design of such an integrating network is well known to the art and is, therefore, not described in detail.

Figure 4:
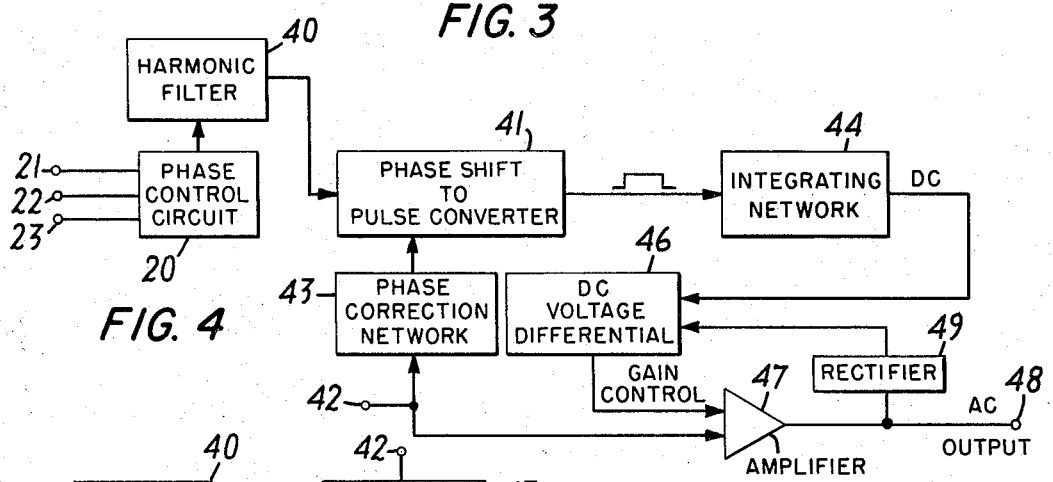
FIG. 4 is a block diagram of apparatus including the circuit of FIG. 2 for converting synchro data to alternating current analog form.

The apparatus of FIG. 4 includes the phase control circuit 20, the converter 41 and the integrating network 44 for converting the synchro angle to alternating current analog form. The direct current output signal from the integrating network 44 is fed to a conventional direct current voltage differential circuit 46 in a feedback loop of a suitable amplifier 47. An alternating current reference voltage, which may be the synchro excitation voltage supplied to the terminal 42, is applied to the input of the amplifier 47, the alternating current output signal from which appears at an output terminal 48, and also is rectified by a rectifier 49 and applied to the differential circuit 46. The differential circuit 46 utilizes the difference between the direct current output voltages from the integrating network 44 and the rectifier 49 to control the gain of the amplifier 47, so that the alternating current analog signal appearing at the output terminal 48 is proportional to the synchro angle of the rotor 11, as desired.

Figure 5:
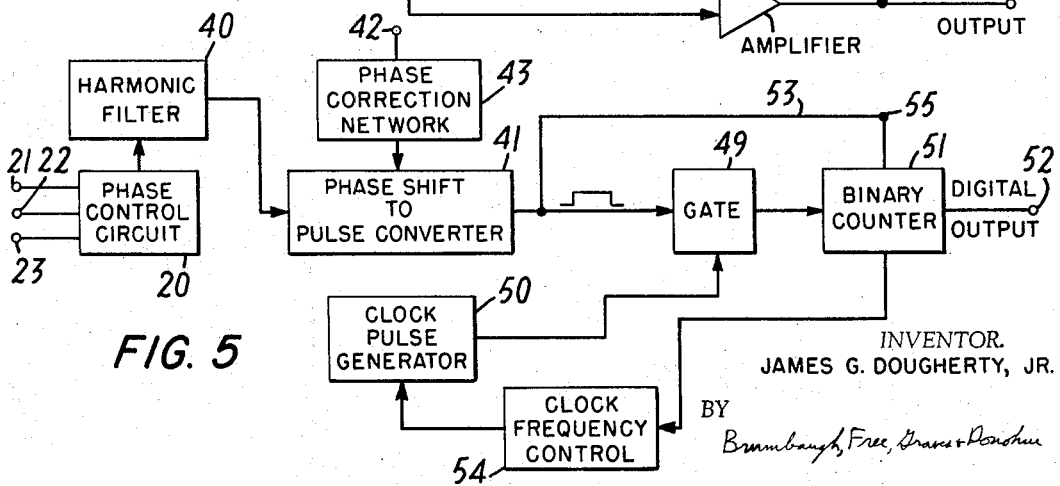
FIG. 5 is a block diagram of apparatus including the circuit of FIG. 2 for converting synchro data to digital form.

The alternate embodiment of FIG. 5 includes the phase control circuit 20 and the converter 41 for converting the synchro angle to digital form. The phase difference signal from the converter 41, comprising pulses of constant amplitude and of duration proportional to the synchro angle $\theta$, controls a conventional gating circuit 49, to the input of which are fed clock pulses produced by a standard clock pulse generator 50. Thus the output of the gate 49 is a series of substantially identical clock pulses, the number being dependent upon the duration of the phase difference signal pulses and the frequency of the clock oscillator controlling the clock pulse generator. These clock pulses from the gate 49 are counted by a conventional binary counter 51 which transmits a digital output serially to an output terminal 52, as is well known to the art. The digital output from the counter 51 may be transmitted in parallel if desired. Thus a digital output is provided which is representative of the synchro angle. The counter 51 is reset at the beginning of each measurement cycle by the output signal from the converter 41, the converter output being applied by conducting means 53 to a suitable input terminal 55 of the counter 51.

If the frequency of the excitation voltage is stable, then the clock oscillator is preferably stabilized, for example, by a suitable crystal (not shown), in order to minimize errors introduced by variations in the number of clock pulses with respect to the period or frequency of the excitation voltage. If, however, the frequency of the excitation voltage is subject to drift, the clock frequency may be adjusted accordingly. This may be accomplished by a suitable clock frequency control means 54 and appropriate conventional gating circuitry (not shown) for periodically sampling the clock frequency during one full cycle of the excitation voltage. For example, during the sampling cycle, the output from the converter 41 may be blocked from the gate 49, which in turn would be conditioned to pass the clock pulses to the counter 51 for the entire sampling cycle. Then the frequency of the clock oscillator would be adjusted high or lower dependent upon whether the number of clock pulses during the sampling cycle is below or above the desired number, which preferably just fills the counter 51. The clock frequency control circuit 54 may include conventional elements such as a flip flop and an integrator, for example, which will increase the clock frequency by one pulse per excitation voltage cycle if there is no overflow from the counter 51, the flip flop remaining in the reset state. If there is an overflow, the flip flop is set and the clock frequency would be decreased by one pulse per excitation voltage cycle. In this way, the clock pulse generator 50 is automatically corrected to produce a constant number of pulses per excitation voltage cycle, i.e. the clock oscillator would hunt between two frequencies separated by one cycle, thereby producing negligible error.

While specific exemplary embodiments of the invention have been shown and described, it will be understood that various substitutions, changes and modifications in the form and details of the illustrated embodiments and their manner of operation may be made by those skilled in the art without departing from the spirit and scope of the invention. For example, both the synchro stator neutral 16 and the common connection of the phase control circuit 20 are shown to be at a common reference point in FIGS. 1 and 2. If the circuit constant of the circuit 20 are so selected that the loads on the three stator terminals 17, 18 and 19 are substantially equal, the neutral point 16 need not be at the common reference point, as any unbalance currents would have negligible effect on the accuracy of the apparatus. On the other hand, while the disclosed exemplary embodiment utilizes line-to-neutral signals, the principles of the invention are also applicable to line-to-line signals which may be modified and combined to provide conversion of synchro data and the like to analog or digital form. Further, the phase shift produced by the phase shifting network 38 under some circumstances may be in the leading direction. It will also be apparent that the principles of the disclosed invention are applicable to the conversion of output signals from conventional resolvers. Therefore, all such variations and modifications are deemed to be included within the intended scope of the invention as defined by the following claims.

I claim:

1. A synchro data conversion apparatus including a synchro transmitter and the like having a rotor winding and three stator windings, wherein the rotor winding is adapted to have an alternating current excitation voltage applied thereto and to be rotated with respect to the stator windings, the combination therewith of output means, transformer means having primary winding means and secondary winding means, said primary winding means being adapted to be connected to two of the stator windings for combining electrical signals appearing across the two stator windings in subtractive relation, said secondary winding means having opposite ends, one of said opposite ends of said secondary winding means being electrically coupled to a reference point of given potential, voltage divider means for dividing said combined subtractive signal by a fixed proportionate factor independent of frequency and having an input coupled to the other of said opposite ends of said secondary winding means and an output coupled to said output means to provide an electrical signal of predetermined proportionate relation to the combined signals appearing across said transformer means, and a phase shifting network providing a predetermined phase shift and having an input adapted to be connected to the third stator winding and an output coupled to said output means to provide an electrical signal to be combined with said proportionate electrical signal from said output of said voltage dividing network in a predetermined additive relation to produce an output signal at said output means having a phase shifted from that of the excitation voltage in an amount representative of the angular position of the rotor winding with respect to the stator windings.

2. A synchro data conversion apparatus including a synchro transmitter and the like having a rotor winding and three stator windings, wherein the rotor winding is adapted to have an alternating current excitation voltage applied thereto and to be rotated with respect to the stator windings, the combination therewith of output means, a transformer having a primary winding and a secondary winding each having respective opposite ends, said opposite ends of said primary winding being adapted to be connected to two of the stator windings for combining electrical signals appearing across the two stator windings in subtractive relation, one of said opposite ends of said secondary winding being electrically coupled to a reference point of given potential, voltage divider means for dividing said combined subtractive signal by a fixed proportionate factor independent of frequency and having an input coupled to the other of said opposite ends of said secondary winding and an output coupled to said output means to provide an electrical signal of predetermined proportionate relation to the combined signals appearing across said primary winding, and a phase shifting network providing a predetermined phase shift and having an input adapted to be connected to the third stator winding and an output coupled to said output means to provide an electrical signal to be combined with said proportionate electrical signal from said output of said voltage dividing network in a predetermined additive relation to produce an output signal at said output means having a phase shifted from that of the excitation voltage in an amount representative of the angular position of the rotor winding with respect to the stator windings.

3. A synchro data conversion apparatus including a synchro transmitter and the like having a rotor winding and three stator windings, one end of each of the stator windings being respectively connected to a common reference point, wherein the rotor winding is adapted to have an alternating current excitation voltage applied thereto and to be rotated with respect to the stator windings, the combination therewith of output means, a transformer having a primary winding and a secondary winding each having respective opposite ends, said opposite ends of said primary winding being adapted to be connected respectively to the ends of two of the stator windings opposite the respective ends connected to the common reference point for combining electrical signals appearing across the two stator windings in subtractive relation, one of said opposite ends of said secondary winding being electrically coupled to a reference point of given potential, voltage divider means having an input coupled to the other of said opposite ends of said secondary winding and an output coupled to said output means to provide an electrical signal of predetermined proportionate relation to the combined signals appearing across said primary winding, and a phase shifting network providing a predetermined phase shift and having an input adapted to be connected to the end of the third stator winding opposite to the respective end thereof connected to the common reference point and an output coupled to said output means to provide an electrical signal to be combined with said electrical signal from said output of said voltage dividing network in a predetermined additive relation to produce an output signal at said output means having a phase shifted from that of the excitation voltage in an amount representative of the angular position of the rotor winding with respect to the stator windings.

4. Apparatus as claimed in claim 3, wherein said output means includes means for producing an output signal of constant magnitude.

5. In synchro data conversion apparatus including a synchro transmitter having a rotor winding and three stator windings, an alternating current excitation voltage being applied to the rotor winding, and the rotor winding being adapted to be rotated to an angular position with respect to the stator windings, the combination therewith of means coupled to two of the stator windings for generating a signal which is the difference between the signals appearing across the respective two stator windings, voltage dividing means coupled to the difference signal generating means for modifying in a predetermined proportionate relation the amplitude of the difference signal to provide a modified amplitude difference signal, means coupled to the third stator winding for shifting the phase of the signal appearing across the third stator winding by a predetermined constant amount to provide a phase-shifted signal, and means coupled to said voltage dividing means and said phase shifting means for adding the modified amplitude difference signal and the phase-shifted signal to produce an output signal having a phase shifted from that of the excitation voltage in response to the angular position of the rotor winding.

6. Apparatus as claimed in claim 5, including means responsive to said output signal of said adding means and to the excitation voltage for generating a signal having pulses of constant amplitude and of duration proportional to the phase shift of said output signal, and means coupled to the pulse generating means for integrating said constant amplitude pulses to produce a direct current output signal of magnitude proportional to the angular position of the rotor winding.

7. Apparatus as claimed in claim 6, including amplifying means coupled to said integrating means, means for applying an alternating current reference voltage to the input of said amplifying means and for controlling the gain of said amplifying means as a function of said direct current output signal to produce an alternating current output signal of magnitude proportional to the angular position of the rotor winding.

8. Apparatus as claimed in claim 6, including harmonic filter means for suppressing unwanted harmonic frequencies in said output signal of said adding means.

9. Apparatus as claimed in claim 5, including means responsive to said output signal of said adding means and to the excitation voltage for generating a signal having pulses of constant amplitude and having a time interval of duration proportional to the phase shift of said output signal, means for generating clock pulses, gating means coupled to said clock pulse generating means and to said pulse generating means for enabling the transmission of said clock pulses during said time interval of said constant amplitude pulses, and binary counter means coupled to said gating means for generating a digital output signal representative of the angular position of the rotor winding.

10. Apparatus as claimed in claim 9, including harmonic filter means for suppressing unwanted harmonic frequencies in said output signal of said adding means.

References Cited

UNITED STATES PATENTS

| | | | |
|---|---|---|---|
| 2,966,300 | 12/1960 | Dickinson | 340—347 |
| 3,136,987 | 6/1964 | Bock et al. | 340—347 |
| 3,147,473 | 9/1964 | Ujejski | 340—347 |
| 3,226,710 | 12/1965 | Tripp | 340—347 |

DARYL W. COOK, *Acting Primary Examiner.*

MAYNARD R. WILBUR, *Examiner.*

W. J. KOPACZ, *Assistant Examiner.*